W. B. WESCOTT.
CINEMATOGRAPHY.
APPLICATION FILED OCT. 9, 1914.
1,309,673.
Patented July 15, 1919.
6 SHEETS—SHEET 2.
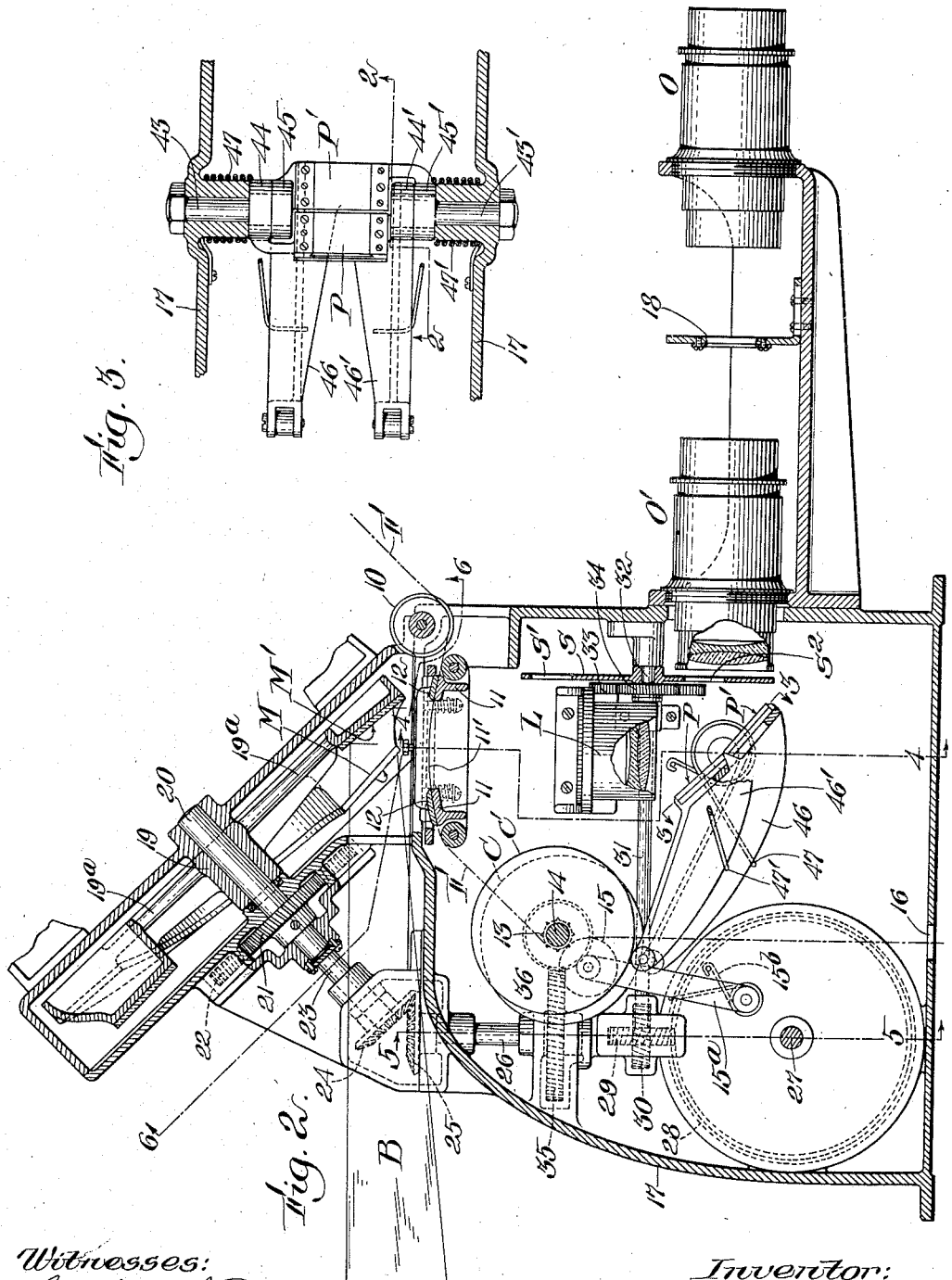
Witnesses:
Josephine H. Ryan
Charles D. Woodbury
Inventor:
William B. Wescott,
by Roberts, Roberts & Cushman
Attorneys.

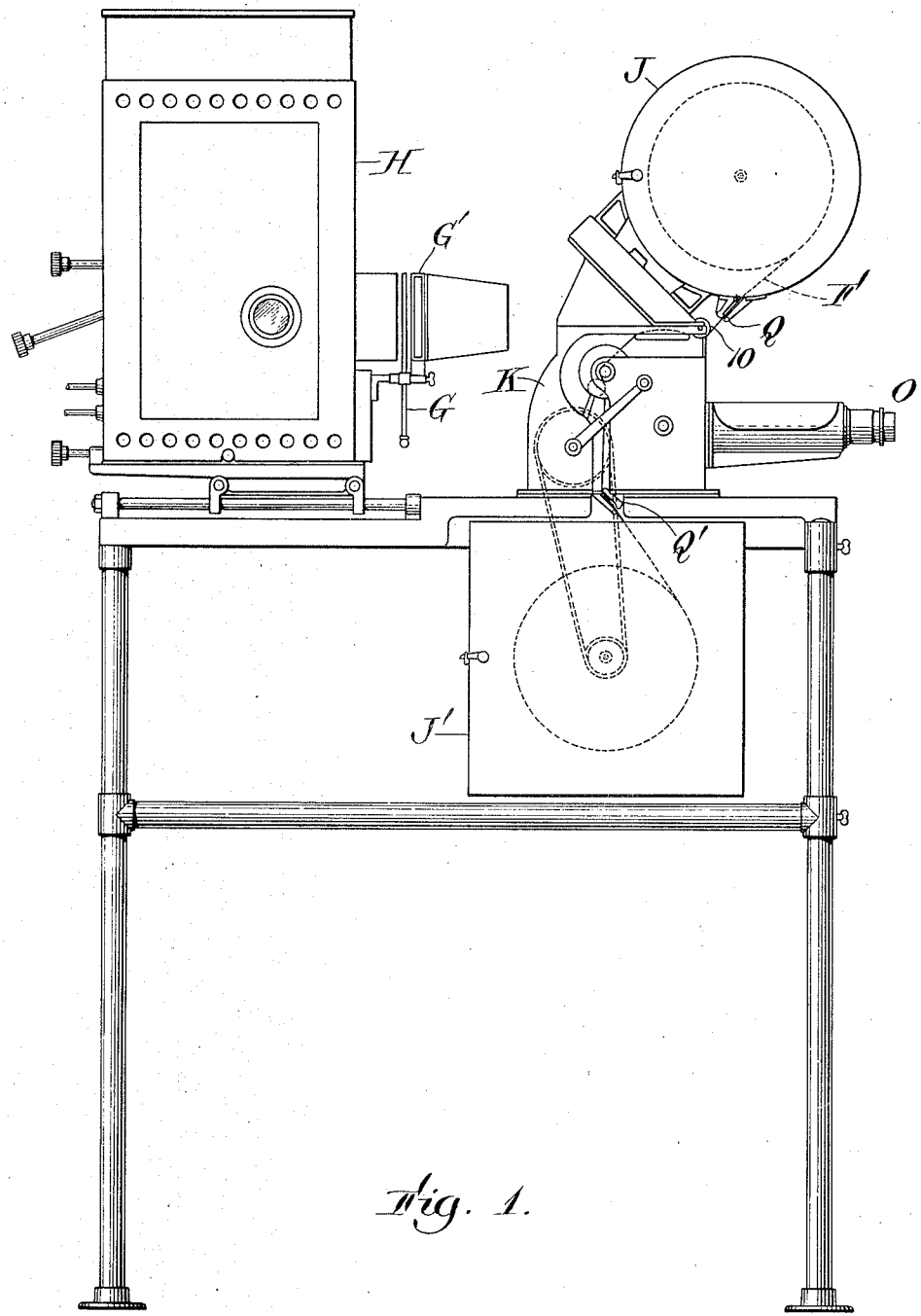

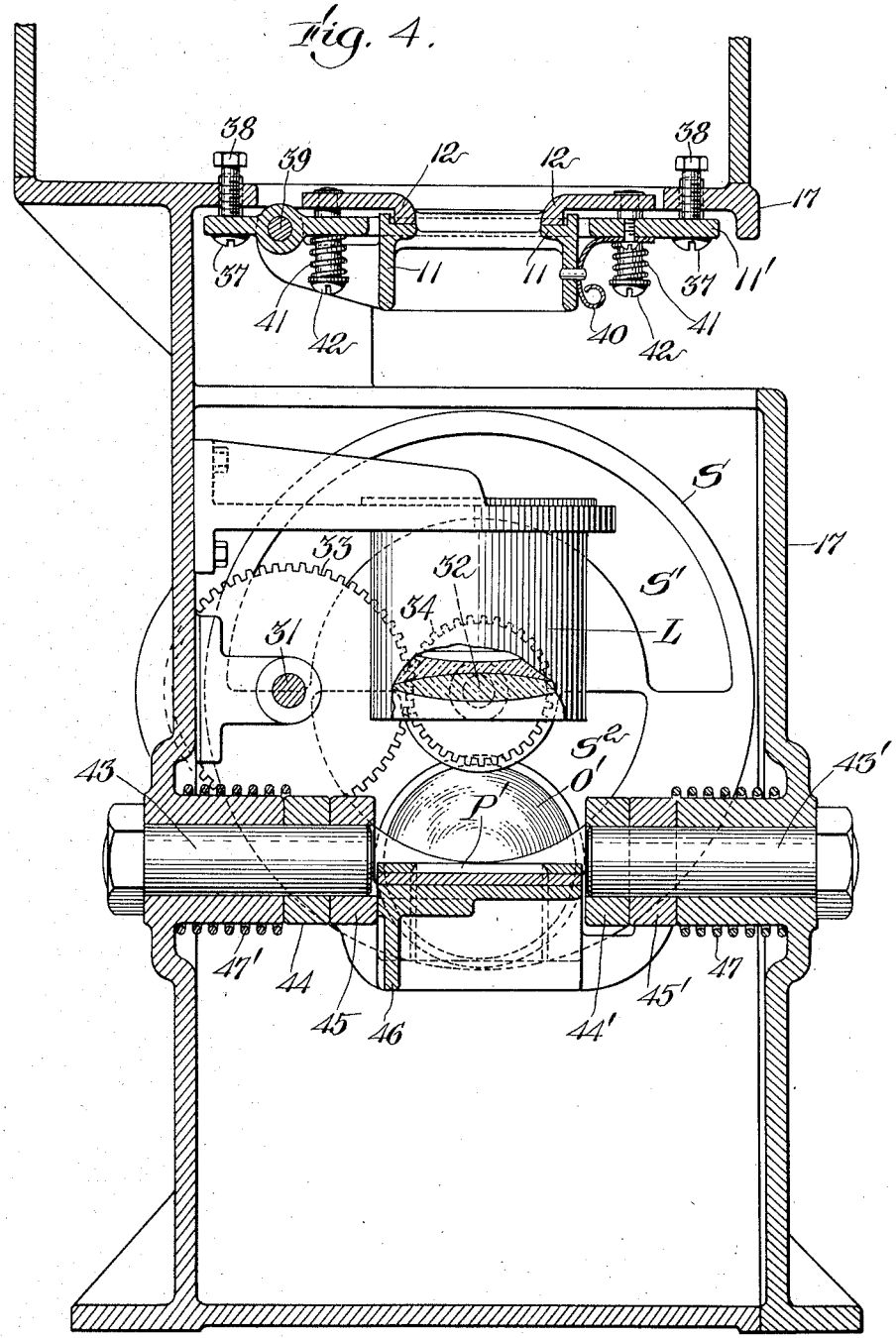

W. B. WESCOTT.
CINEMATOGRAPHY.
APPLICATION FILED OCT. 9, 1914.

1,309,673.

Patented July 15, 1919.
6 SHEETS—SHEET 4.

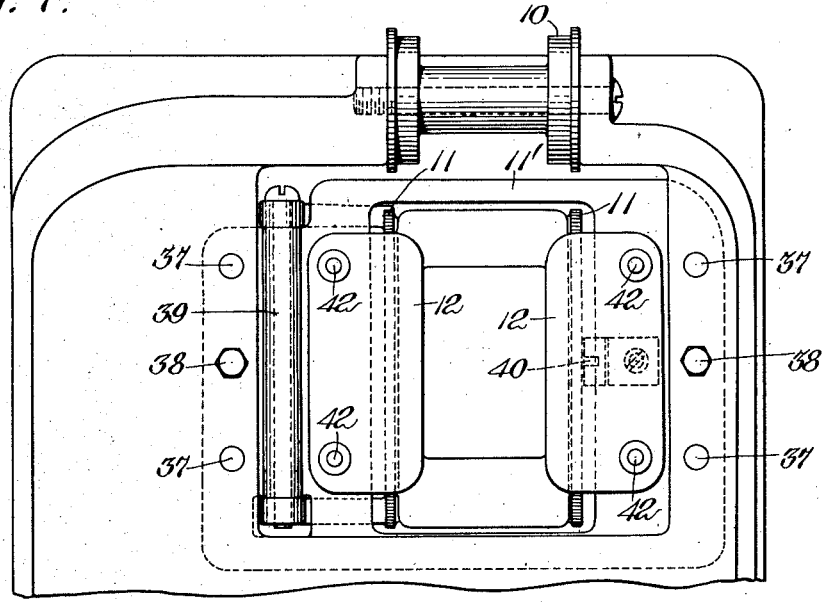
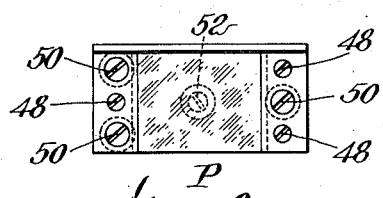
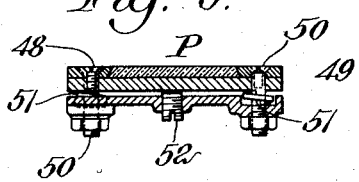

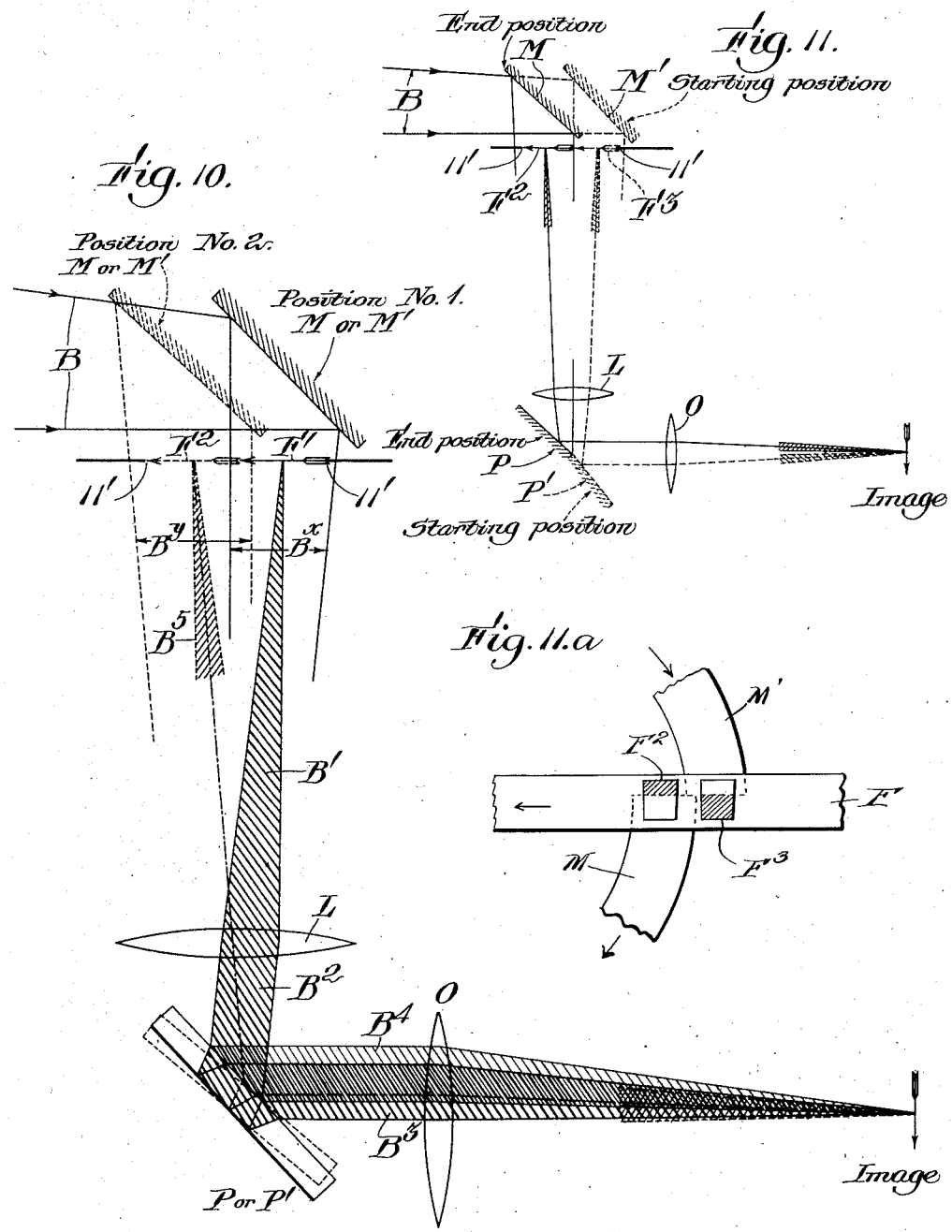

UNITED STATES PATENT OFFICE.

WILLIAM BURTON WESCOTT, OF WELLESLEY, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHY.

1,309,673.  Specification of Letters Patent.  Patented July 15, 1919.

Application filed October 9, 1914. Serial No. 865,962.

*To all whom it may concern:*

Be it known that I, WILLIAM BURTON WESCOTT, a citizen of the United States, and resident of Wellesley, in the county of Norfolk and State of Massachusetts, have invented new and useful Improvements in Cinematography, of which the following is a specification.

There are several well-known reasons why a motion picture projector using a continuously moving film would be greatly superior to the present type of intermittent motion film. Besides increasing the life of the film with ordinary usage, machines of this type lend themselves readily to the production of pictures which pass more or less continuously into each other on a screen, thus eliminating the disagreeable luminosity flicker commonly present in motion pictures. Moreover, owing to the absence of the destructive intermittent motion the film can be run at speeds much higher than is practicable with machines in which this motion is present thus making possible simple three-color projection hitherto unattainable. The absence of the dark interval between pictures on the other hand, permits a low picture frequency, which is desirable not only in the slowing down of motions photographed at a higher frequency but also in certain cases for the reduction of the so-called "motion flicker" as distinguished from luminosity flicker. Such machines should be capable of being run at any speed from zero up to, say, 40 or 50 pictures a second.

The best present motion picture practice involves the use of a shutter so shaped or used that the dark intervals are equal to or a large portion of the light intervals, hence, above the fusion threshold, the intensity of the projection beam must be, for a given screen area and illumination substantially greater and often twice that required where there is no dark interval.

Therefore the theoretical minimum projection-beam intensity is that which gives the desired screen illumination when uninterruptedly reaching the screen, and the theoretical minimum of light is reached when the desired screen illumination is attained with a beam of minimum intensity which just covers the picture projected.

In order to eliminate the dark interval, one picture must be replaced by the next by first, a progressive substitution, either of one picture as a whole by the next by first, the increase and corresponding decrease of intensity of the beams projecting two pictures in register on the screen, or second by a lateral or vertical progressive substitution of corresponding sections of succeeding pictures.

The first involves the coincident complete illumination of both pictures, hence, either two beams from two sources (impossible to maintain of equal intensity) or parts of the same beam covering both pictures may be used. In either case the difficulty of maintaining an equal illumination of the picture is great and but half the total light passing through the two pictures reaches the screen. The above dissolving substitution will not be further considered because the irreducible minimum loss of light is at least 50% greater than is attainable by progressive substitution.

The second may be either a rapid or a slow progressive substitution; that is, the time of substitution may occupy but a small fraction of the time allotted to each picture or it may occupy the whole of such time. In the latter case, the picture projected is made up of a slowly decreasing part of one picture and a correspondingly increasing part of the next, except at the instant when the second has been completely substituted for the first. In general, a slow substitution will produce a distortion wave which, except at very high speeds, will readily be detected and hence mar the screen picture.

Among the many published designs for continuous film motion cinematographs, there is not one of even indifferent commercial success, and the cause of the failures lies largely in the unique accuracy needed in the essential optical and mechanical parts. To be practically successful the machine must not only be accurate when it is first made, but it must not lose this accuracy in use.

The general problem which faces the designer of a continuous film motion cinematograph is that of obtaining an undistorted stationary image of a moving object. It can readily be seen that this end cannot be attained without the introduction of some other motion into the optical system. In the special instance here considered the object is the moving film and the final image is the picture on the screen. Between the two is a series of optical elements, and it follows that in order to make the screen picture stationary there must be motion somewhere in this series. In general, the motion will be of one element in a series only. In this case the stationary optical system between this element and the film serves to form a moving image of the film, which image becomes the object for the element in question. The special problem is so to move this movable optical element that the image produced by it in turn will be stationary at the screen, or act as a stationary virtual object which may be framed and projected on a distant screen or otherwise treated by subsequent optical devices.

The fundamental requirements made of such machines are that the individual pictures be brought to rest optically; that successive pictures be accurately superimposed; and that the illumination of successive pictures be constant and uniform.

To produce a rapid progressive substitution of succeeding pictures there is required a plurality of compensating reflectors, two of which must receive light, at the time of substitution, from all parts of corresponding pictures, hence there must be either two projection beams or one beam must either shift from one reflector to the next or be traversed by the reflectors. But it has been pointed out that the motion of the compensating reflector must be of a very high order of precision, hence should be of the simplest nature possible; whereas the motion of any means to move the beam from one reflector to the next need not be so precise.

In general, therefore, it will be desirable to so move the projection beam before it reaches the film that progressive substitution is attained by projecting successive pictures along distinct paths to corresponding compensating reflectors.

In order to avoid discontinuity in projection either in the nature of a dark interval or a blur as one picture gives place to the next, there must be at least two moving compensating elements, since it is obvious that if such discontinuities are to be avoided, there must be instants when two film pictures are simultaneously in action. For satisfactory results, therefore, there should be at least two moving optical parts. From two the number may be increased indefinitely up to the limit of convenience.

It is obvious that in general the film gate opening must be at least two pictures long, in order that, at the time of substitution, both the picture being exposed and the next succeeding picture may be exposed to the projection beam, and further that the projection beam must either cover two pictures in the film gate opening or cover and follow one picture and swing back to the next succeeding picture to produce progressive substitution.

In addition to the many special difficulties which must be overcome in the production of a successful continuous film motion cinematograph, there is a general difficulty which appears in nearly every aspect of the problem. This is the difficulty imposed by the requirement of extreme optical and mechanical accuracy which has already been mentioned as one of the chief causes of the failure of extant designs. This requirement of accuracy makes itself felt in two general directions, first, with regard to the correctness of all optical surfaces which have to deal with moving images or objects, and second, with reference to the exactness of the motions themselves, and hence of the mechanical arrangements which cause these motions.

In a perfect machine the film and optical devices would be so moved that the displacement of the image space would be exactly equal and opposite to that of the image in that space, that is, the film motion and the compensation movement would be perfectly matched, but since it is necessary to connect these two motions in practice by more or less fallible mechanical systems only an approximation to the ideal can be attained. It is the closeness of this approximation in service which must determine the success or failure of a given machine.

In the ordinary stationary projection of a single lantern slide, a distortion of the whole picture, say a narrowing of two or three per cent. would not be noticeable to the eye. In the case of motion picture projection with a continuously moving film, however, this distortion would cause the image of a given point in the picture to move on the screen and a blur would result. Moreover, the pictures which follow each other in the series must be of the same light intensity, and must accurately coincide. This latter requirement exists also, of course, for the ordinary cinematograph, but additional difficulties in securing satisfactory registration enter in the case of the continuous film motion machine.

In the average case, if a stationary point in the picture on a screen varies in position during the time that one film picture is active by more than about an eighth of an inch to an observer at a distance of fifteen or twenty feet, there will be a perceptible blurring of the screen picture. An eighth of an inch on the screen is about .001 or one tenth of one per cent. of the size of the whole screen picture, and since this picture is simply an enlarged reproduction of the film picture the same fractional accuracy holds for the latter. Hence it follows that if there is any persistent irregularity in the motion of the film with relation to the moving optical parts designed to compensate for the film motion as large as .001, the size of a film picture, blurring will result.

In such apparatus there are physical difficulties such as compensation made optically imperfect by relating to one point or line of the picture only, instead of its whole area; or, when compensation applies to all points of the area, because this is attained only in parallel rays from a point source, which in practice are unattainable; or because the image is distorted or the definition imperfect due to undesirable refractive effects in the optical parts or due to the necessary position of the image with respect to optical parts; or because of chromatic effects due to dispersion (especially harmful in the case of compensation by motion of a refractive element when correction becomes physically impossible); or because of the necessity of irregular motion of the optical element or of the film in the case of compensation by refractive elements; or because of the loss of light in the optical system (any excess of light being accompanied by an excess of heat which is damaging to the film); or because of a dark or blur interval between film pictures on the screen; or because of the presence of "ghosts" or double images when a back-silvered glass mirror is used with non-parallel rays incident other than perpendicular to the surface. There are mechanical difficulties because of the lack of precision and lack of permanent accuracy essentially characterizing the motions of gears, chains, and certain forms of cams, especially when connecting the film and compensation motions, because of the vibration due to rapid irregular motions, because of the easy vitiation of metal surface mirrors; because of general mechanical intricacy; and because of the mechanical difficulty of superimposing pictures from two separate film-driving systems. There are economic difficulties, such as the loss of light, the cost of unusual lenses, prisms, mirrors or other optical parts, of constructing precision instruments, in general, of a multiplicity of optical elements, of making complicated mechanisms in general and the inadvisability of requiring a non-standard film.

The object of the present invention is to produce a continuous film motion and a uniform and continuous illumination cinematograph which shall approximate optical and mechanical perfection as closely as possible, which shall economize the use of light, which shall be simple and durable in construction and shall contain the fewest possible number of parts, especially between the film-driving and the compensating elements, thus reducing the chance of inaccuracy either in the original construction or as a result of wear, and in general to overcome the difficulties above set forth.

To this end I have devised a cinematograph in which the beam of light projected through the film is moved with the film whereby the major or effective portion of the light beam is projected during a desired period of time through one picture of a constantly moving series substantially without loss of light, and with the further advantage that light of relatively low intensity, and consequently generating less heat, may be used, thereby reducing the danger of burning the film. The beam following the successive film pictures is so manipulated before the film as to shift the beam passing through successive film pictures to successive compensating reflectors. This motion is in that part of the system where less accuracy is required.

It has been proposed to use a single curved compensating surface but the distortion and lack of definition introduced by such a surface could be corrected for one position only of the film picture. In order to correct for all positions of the picture some form of true compensating element must be used, such as plane mirrors or totally reflecting prisms, and there must be at least two such compensating reflectors, each to take up a new picture while the preceding reflector is returning to its starting position in order to effect progressive substitution of the series of film pictures without dark intervals between them.

In the form of machine herein shown the means for moving the beam with the film consists of two revolving helical mirrors, in each of which the angle made by an extension of a radial element of the reflecting surface with the axis of rotation progressively varies, and is different in the two mirrors. The beam from each mirror while moving with the film is thus also swung about a fixed point, or kept in line with a fixed point, or near enough such point so that the movement of the beam where it meets the compensating reflector is substantially less than at the film which enables the beam to be projected to and held upon the desired portion of a comparatively small compensating element. This not only permits the use of compensating elements of conveniently small size, but permits the projected path of the beam from the compensating element to the objective to be as near as may be to the axis of the objective.

A single beam covering two pictures might be used by swinging the beam to succeeding compensators; but such beam would at all times have to be shuttered for the area of one picture and then at least half the light—and in practice a good deal more than half the light—would be wasted. A beam covering only a single picture, and thus resulting in the least loss of light, would have to be swung not only to succeeding compensating reflectors but to succeeding pictures as well.

Thus to use a single beam which but just covers a single picture, without impressing on the reflectors motions not essential to the compensation, the beam must undergo two motions before the film. This is accomplished by the helical mirrors of the present machine, since the angles of the reflecting surfaces of the two helical mirrors are different, and the light beams reflected therefrom are therefore swung about two points and are alternately projected upon two oscillating compensating reflectors.

While it is believed that for mechanical reasons the helical mirror affords the best means for causing the light beam to follow successive film pictures and for shifting the beam from one compensator to another, it is to be understood that the invention is not limited to such means but contemplates the use of any means for obtaining the same result.

In this machine provision is also made for compensating for the motion of the film in a region at which parallel rays from any point in the film to the compensating reflector, are obtained by means provided for that purpose, whereby to make it possible to use back-silvered mirrors without producing "ghosts" by reason of surface reflection. This avoids the use of front silvered mirrors which rapidly deteriorate.

The compensating mirrors oscillate on an axis in their reflecting surfaces and are actuated by two identical cams fixed to the same shaft which carries the film sprocket and drives the film, thus eliminating objectionable gearing or chain connections between the film-drive and the compensating elements, and practically nullifying the loss of precision due to the wear of the cams since the effect of the absolute amount of wear of the cams is not felt but only the difference between the wear of the two cams.

Further, the film passes through a curved film gate which has its center of curvature in the axis of rotation of the oscillating compensating mirrors, so that the motion of the film may be truly twice the angular velocity of the mirrors. These and other features will hereinafter be more fully described and particularly pointed out in the claims.

In the accompanying drawings which illustrate one embodiment of a cinematograph or motion picture machine exemplifying the invention,—

Figure 1 is a side view of an optical lantern as a whole, containing the invention;

Fig. 2 is a longitudinal section, partly in side elevation, on an enlarged scale illustrating the motion head containing the invention;

Fig. 3 is a sectional view on line 3—3 of Fig. 2, showing a plan or face view of the compensating mirrors, the line 2—2 indicating the plane of the section shown in Fig. 2;

Fig. 4 is a sectional view on an enlarged scale on line 4—4 of Fig. 2;

Fig. 7 is an enlarged view in plan of the film gate and film guide roll;

Fig. 8 is a plan view on an enlarged scale of one of the compensating reflectors and its mount;

Fig. 9 is a central sectional view of said compensating element and its mount shown in Fig. 8; and Figs. 10, 11 and 11ª are diagrammatical views illustrating the action of the helical mirrors and the compensating reflectors upon the light beam.

Figure 6:
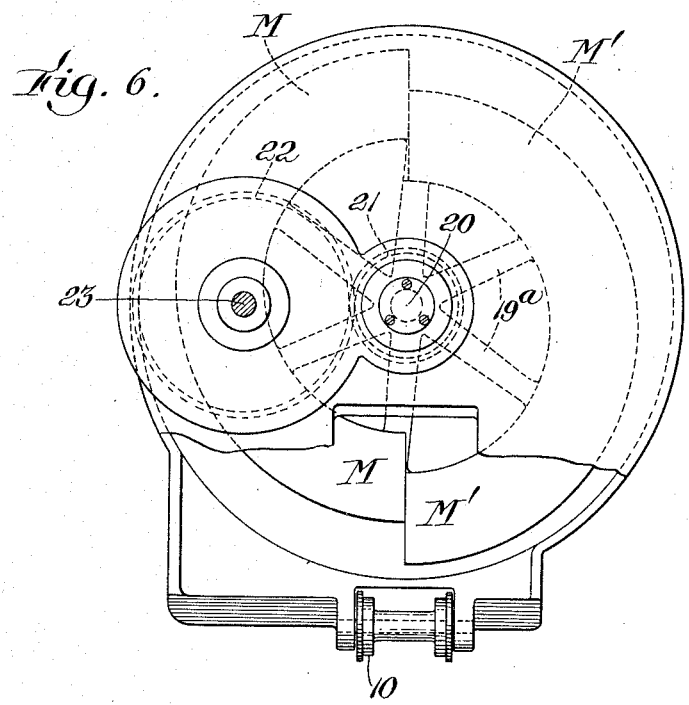
Fig. 6 is a sectional view on line 6—6 of Fig. 2, showing a plan view of the under side of the helical mirrors and their casing.

In Fig. 1, H is a lamp house of the ordinary Fire Underwriter's type, G being a swinging shutter, suitable for use with the slide frame G' for ordinary projection.

J and J' are respectively the feed reel and take-up reel magazines. Fire traps of any approved type may be used at Q and Q' where the film enters and leaves the motion-head K containing the invention, through which the film passes in its travel from the feed reel magazine J to the take-up reel in magazine J'.

The film F passing from the feed reel enters the motion head K under the guide roll 10 (Figs. 1, 2, 6 and 7) and between the film-gate members 11 and 12, (Figs. 2, 4 and 7) thence over the driving sprocket 13 on the cam shaft 14 (Figs. 2 and 5), leaving the driving sprocket over the pressure roll 15 and thence out to the take-up reel in the magazine J' through the fire trap Q' (Fig. 1) and the slot 16 in the main housing frame 17. The pressure roll 15 is carried by an arm 15ª journaled on a stud projecting inward from the wall of casing 17, and normally urged into operative position against the film sprocket and film by a torsion spring 15ᵇ.

The convergent light beam B from the lamp house H is reflected to the film from the revolving helical mirrors M and M', in such a way that the beam illuminating one picture follows the picture along during its travel through the film gate and shutters that picture and exposes the next by the relative displacement of the helical mirrors M and M'. The helical mirrors are mounted on a revolving frame, and each occupies half of the circumference; and the angle made by an extension of a radial element of the reflecting surface of each helical mirror with its axis of rotation varies progressively from end to end of the mirror, so that the beam moving with the film picture will also be swung as though about a substantially fixed point, and may thereby be projected in the desired position upon the surface of a relatively small compensating reflector. The light beam from the helical mirrors passes through the lens L to the oscillating plane compensating mirrors P and P',—the beam from mirror M reaching mirror P, and the beam from mirror M' reaching mirror P'. The lens L is so situated that the film in the film gate is in its principal focal plane, hence all light from a point in the film leaves the lens as parallel rays, which permits the use of back-silvered plane mirrors at P and P'.

The mirrors P and P' are oscillated about an axis in their projected reflecting planes by the two identical cams C and C' mounted on the sprocket shaft and cam shaft 14, and maintain a stationary image formed by the objective O' in the framing window 18, which image is then projected to the screen by an objective O of the desired focal length.

A disk shutter S (Figs. 2 and 4) having shutter openings S' and $S^2$, is provided to mask the mirrors during their return motion, thus preventing any stray light from reaching the objective O'.

Figure 5:
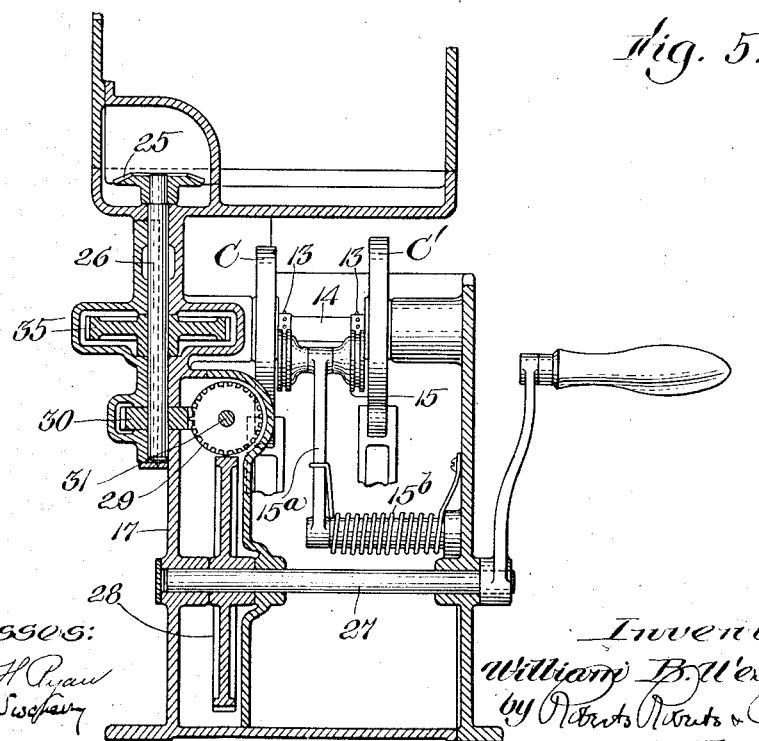
Fig. 5 is a sectional view on line 5—5 of Fig. 2.

The two helical reflecting surfaces M and M' are mounted on arms $19^a$ extending from the hub 19 keyed to the inclined shaft 20 driven by the gear 21, which is driven in turn by the gear 22 (Figs. 2 and 6). The gear 22 is mounted on a shaft 23, which carries at its lower end the beveled gear 24 which meshes with the beveled gear 25 on the vertical shaft 26. (Figs. 2 and 5.)

The main crank shaft 27 (Figs. 2 and 5) provided with the usual driving crank, and journaled in the walls of the main casing 17, carries a gear 28 which drives the vertical shaft 26 through the gears 29 and 30. The gear 29 meshing with the driving gear 28 drives the shaft 31 and the shutter S on its shaft 32 through the gears 33 and 34 (Figs. 2 and 4). The vertical shaft 26 carries a gear 35 which meshes with a gear 36 keyed to the cam and sprocket shaft 14.

Referring to Figs. 4 and 7, it will be noticed that the film gate frame 11' is fastened to the main housing 17 by the screws 37 and may undergo vertical adjustment by the coöperation of the screws 37 with the bolts 38. The lower fixed member 11 of the film gate is adapted to swing about a hinge 39 and is held in position by the snap spring 40.

The upper film gate member 12 is held down against the lower member 11 by the springs 41 acting along the shank of the screws 42. Thus it is free to ride over any film splice, while the lower member (which determines the film's position with relation to the lens L and the oscillating mirrors P and P') is, when in its operative position, rigidly positioned.

The film gate is curved as best shown in Fig. 2, its center of curvature, and that of the film within the gate, being in the axis of rotation of the reflecting surfaces of the compensating mirrors P and P'. Thus the lengths of the paths from all parts of the film to the axis of the oscillating reflectors is the same; and a uniform angular velocity of the film about the axis of oscillation of the reflectors is obtained with a uniform motion of the film.

The oscillating mirrors P and P' are mounted on the studs 43 and 43' projecting inward from the walls of the housing 17. Mirror P has a bearing 44 on stud 43 and a bearing 44' on stud 43', while the mirror P' is carried by the bearings 45 and 45' on studs 43 and 43' respectively. (Figs. 3 and 4).

The mirrors are rigidly secured to and actuated by the arms 46 and 46' which coöperate with the cams C and C'. These are held in operative relation to the cams by the torsion springs 47 and 47'.

The mounting of the compensating mirrors may be understood by reference to Figs. 8 and 9. The screws 48 serve to clamp the mirror (P or P') in place on the plate 49 while the bolts 50 and the springs 51 permit slight angular adjustment about the central set-screw 52, through which a vertical adjustment is obtained.

If front silvered mirrors P and P' are used, the lens L may be dispensed with, but in order to use back silvered mirrors a lens L having its principal focus in the plane of the film is necessary to bring all the rays from any point in the film into parallelism.

The optical principles involved in this machine may be further explained by reference to the diagrams in Figs. 10 and 11. Fig. 10 represents diagrammatically two positions of the same helical mirror and the corresponding positions of one of the compensating reflectors, with the resultant action of the beam of light. "Position No. 1" of the helical mirror M or M', as the case may be, shown in full lines, is the starting position when the mirror reflects the light beam B and first projects the reflected beam $B^x$ through a complete film picture which has just entered the film gate 11', and occupies the position indicated by the arrow F'. Taking a pencil of light, as B', in the projected beam, from any point in the film picture F', it will be seen that all of the light from such point will leave the lens L in parallel rays, since the film lies in the principal focal plane of the lens. The pencil of parallel rays $B^2$ upon meeting the compensating reflector P or P' (in solid line position) will be in part refracted to the silvered back of the mirror and in part reflected from the glass surface of the mirror. The rays refracted and passing through the glass to the silvered back will be reflected thereby and again refracted upon passing out of the glass. All of said reflections and refractions however, are equal and consequently all rays passing from the mirror P or P' to the objective O will be parallel. $B^3$ represents the light reflected from the back silvered surface of the mirror, and $B^4$ represents the light from the front surface of the mirror. But since all parallel rays reaching the lens O will be brought together at its focus, the double reflection will not appear at the "Image," and the effect of "ghosts" caused by front surface reflection will be obviated. This result is attained by the use of lens L which gives parallel rays from any point in the film to the compensating mirror.

The film is moving in the direction of the arrows across the film gate 11', and the compensating mirror is oscillated about an axis in its reflecting surface at one half the angular velocity of the film. The helical mirror (M or M') travels with the film and causes the light beam to follow the film picture. When the helical mirror has reached "position No. 2" shown in dotted lines, and the film picture has reached position $F^2$, which is its end position in the film gate 11', the compensating mirror (P or P') will have been oscillated to its dotted line position. By reason of the progressively varying angle made by an extension of the radial elements of the reflecting surface of the helical mirror with the axis of rotation, the reflected beam passing through the film will have been swung about a point, or approximately about a point, so that in its final position $B^y$ the beam will fall upon approximately the same portion of the mirror, P or P'. The pencil of rays $B^5$ from the given point in the film will undergo refractions and reflections similar to the rays of B', and will be brought to a focus at the same point in the image.

Fig. 11 illustrates diagrammatically the relation between the two helical mirrors M and M' and their corresponding compensating mirrors P and P'. The helical mirror M is assumed to be in its end position and the film picture $F^2$ also in its end position about to pass out of the film gate 11'; and the helical mirror M' is in its starting position and the next succeeding film picture of the series, $F^3$, is in its starting position, having just come into the film gate. As the rear edge of the mirror M travels across the picture $F^2$ a progressively decreasing portion of the picture is projected to the screen, and as the forward edge of the mirror M' travels across the picture $F^3$ a progressively increasing portion of the picture is projected to the screen. Thus in Fig. 11ª, showing a bottom plan of portions of the film and helical reflectors during the period of substitution, picture $F^2$ is about two-thirds illuminated and the succeeding picture $F^3$ is about one-third illuminated. The motions of the reflectors and their angular relations are such that at any instant during the period of substitution the portions of the two pictures $F^2$ and $F^3$ which are projected to the screen by the respective reflectors fit together as indicated by the central lines of the two pencils of light drawn from central points of two successive film pictures in Fig. 11, thus maintaining at the time of such progressive substitution a complete picture on the screen, made up of a diminishing part of the one picture and a corresponding increasing part of the next succeeding picture. The difference in the angles made by the two helical surfaces with their axis of rotation causes the beam reflected by said surfaces to reach each a different compensating element, while the progressively varying angle made by the radial elements of each surface swings the beam so that it falls on substantially the same limited surface of its compensating element notwithstanding the movement of the beam with the film. The film thus becomes the virtual source of two beams oblique to each other and projected in distinct paths, as more fully explained in an application filed by me June 20, 1914, Serial Number 846,224, which admits of the use of two or more compensators to reflect the beam alternately to the screen without getting in each other's way and to effect progressive substitution without dark intervals.

I claim:

1. A motion picture machine having means to move a film continuously, a plurality of flat compensating reflectors, means to project a light beam in changing directions between successive film pictures and first one and then another of said reflectors, in combination with means to move said reflectors in relation to said changing directions.

2. In a motion picture machine, means to move the film continuously, a plurality of compensating reflectors, and means to direct a light beam through the film, said means causing said beam to change its position to follow successive film pictures, means to shift the path of said beam from one to another of said compensating reflectors, and means to move said light directing means and said reflectors coördinately.

3. A motion picture machine having means to move a film continuously, reflectors, and means to project a beam of light in changing direction so as to remain in line with one of said reflectors and the same part of said film during a predetermined motion of said film, in combination with means to move said illuminated reflector during said motion of the light beam and film to compensate for the changing direction of said light and said part of said film, and means for recurrently and similarly illuminating another part of said film and another moving reflector.

4. A motion picture machine having means to move a film continuously, a plurality of rockable compensating reflectors, and means to cause a light beam to be directed upon first one and then another of said reflectors, to illuminate and to move with respective parts of the film, in combination with means for rocking the reflectors when illuminated thereby in relation to the motion of the film to compensate for the motion of the film.

5. In a motion picture machine, means for illuminating successive film pictures comprising means for causing a beam of light to be directed upon the same part of the film during predetermined motion thereof, said means causing said beam to swing through an angle at a given point during said motion; a compensating reflector at or near said point, in combination with means for similarly directing and moving said beam on a following picture and another similar reflector at a following time, and means for moving said reflectors during the respective parts of the motion of the film to compensate for the motion of said film as viewed in said reflectors.

6. In a motion picture machine, means to move the film continuously, a plurality of flat compensating reflectors, and means adapted to cause a light beam to follow successive film pictures and to direct said beam through the film first to one and then to another of said compensating reflectors and means for causing synchronous relative movement of said means, and reflectors in relation to the film.

7. In a motion picture machine, means to move the film continuously, a compensating reflector, and operating means therefor, a helical mirror and means to rotate said mirror at a rate related to the progress of the film, the angle made by an extension of a radial element of the reflecting surface of said helical mirror with its axis of rotation varying progressively along the length of the mirror, adapted to cause a light beam to follow a film picture and to project said beam through the film to the compensating reflector.

8. In a motion picture machine, means to move the film continuously, a plurality of oscillatory compensating reflectors, and means to move them, a plurality of helical mirrors and means to rotate said mirrors adapted respectively to cause a light beam to follow successive film pictures and to project said beam through the film first to one and then to another of said compensating reflectors.

9. In a motion picture machine, means to move the film continuously, a plurality of compensating reflectors, a plurality of helical mirrors and means to rotate said mirrors, the angle made by an extension of a radial element of the reflecting surface of each helical mirror with its axis of rotation varying progressively along the length of the mirror, said helical mirrors being adapted to cause a light beam to follow successive film pictures and to project said beam through the film to the corresponding compensating reflectors, and means for moving the corresponding reflector during each following movement of said beam to reflect said beam in a constant direction.

10. In a motion picture machine, means to move the film continuously, a plurality of compensating reflectors, and a plurality of helical mirrors, the angles made by the two helical surfaces with their axis of rotation differing from one another, said mirrors being adapted respectively to cause a light beam to follow successive film pictures and to project said beam through the film first to one and then to another of said compensating reflectors, and means whereby said mirrors are rotated and said reflectors are moved in synochronism with the moving film.

11. In a motion picture machine, means to move the film continuously, a plurality of compensating reflectors, and means to rock each of said reflectors about a fixed axis so as to reflect each part of the moving film in a constant direction, means to cause a light beam to follow successive film pictures and to project said beam through the film first to one and then to another of said compensating reflectors, an image frame surrounding the locus of said directions, and a lens in the path of the beam from the compensating reflectors adapted to image the film picture substantially in the plane of said frame.

12. In a motion picture machine, means to move the film continuously, a plurality of compensating reflectors, and means to move them whereby to reflect light from successive film pictures in a constant direction, means to cause a light beam to follow successive film pictures and to project said beam through the film first to one and then to another of said compensating reflectors, two objective elements having an optical axis in said direction and in the path of the beam from the compensating reflectors, and an image frame between said objective elements, the rear objective element being adapted to image the film picture substantially in the plane of said frame.

13. In a motion picture machine, means to move the film continuously, means to project a beam of light through successive film pictures, a pair of back silvered plane-parallel oscillating compensating mirrors and means for oscillating them, and a lens in the path of the beam passing to the compensating mirrors so situated that the film is in its principal focal plane.

14. In a motion picture machine of the continuous motion type, a film-driving element, a shaft on which said element is mounted, two movable compensating reflectors, and means for oscillating the compensating reflectors, the oscillating means including cams on said shaft respectively controlling the movement of the reflectors in both directions.

15. In a motion picture machine of the continuous motion type, a film-driving element, a shaft on which said element is mounted, two movable compensating reflectors, and means for oscillating the compensating reflectors, the oscillating means including cams on said shaft continuously controlling the movement of the reflectors.

16. A motion picture machine having in combination means for guiding and means for continuously moving a film, illuminating means for said film, a lens having its principal focus at said film, whereby light originating at said film is parallel beyond said lens; compensating reflectors in the region of the parallel light, means to move said reflectors in turn at half the angular velocity of the film with respect to a point of said reflectors, and an image-forming optical train coaxial with the direction of reflection of said parallel light thereby.

17. A motion picture machine comprising means to move a film continuously, a compensating reflector, and means to project a beam of light from a film picture to the compensating reflector in such manner that the beam moves with the film in the region of the film and is continuously orientated so as always to be directed toward a substantially fixed point.

18. A motion picture machine comprising means to move a film continuously, a plurality of compensating reflectors disposed along the optical axis, means to project beams of light through successive film pictures to the respective reflectors so that the beams travel with the film in the region of the film and so that the beams are always directed to substantially fixed points respectively, and means to move said reflectors to compensate for the motion of the film.

19. A motion picture machine comprising means to move a film continuously, a plurality of oscillatory reflectors disposed along the optical axis, means to project beams of light through successive pictures on the film so that the beams travel with the film in the region of the film and so that the beams are continuously orientated to fall on the reflectors respectively, and means to oscillate said reflectors to compensate for the motion of the film.

20. A motion picture machine comprising means to move a film continuously, a plurality of oscillatory reflectors disposed along the optical axis, means to project beams of light through successive pictures on the film so that the beams travel with the film in the region of the film and so that the beams are continuously orientated to fall on the reflectors respectively, and means to oscillate said reflectors about an axis normal to the optical axis to compensate for the motion of the film.

Signed by me at Boston, Massachusetts, this fifth day of October, 1914.

WILLIAM BURTON WESCOTT.

Witnesses:
 ROBERT CUSHMAN,
 RICHARD W. HALL.